Jan. 10, 1950
J. L. McKNIGHT
2,493,985
SPEED WARNING DEVICE
Filed Feb. 24, 1947
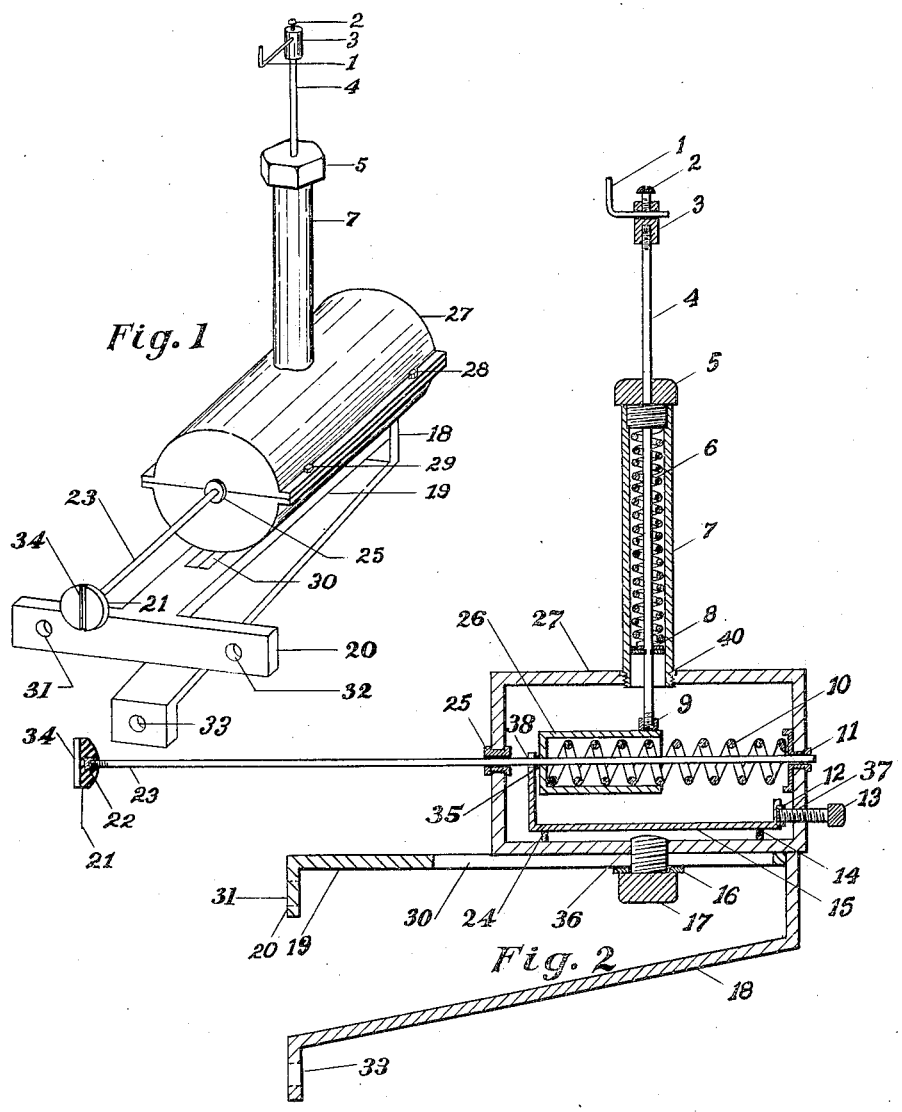
Fig. 1
Fig. 2
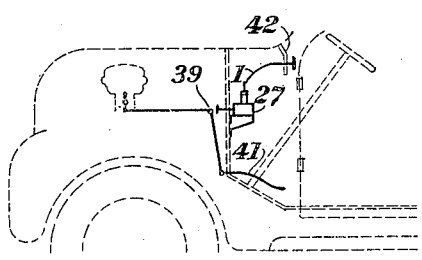
Fig. 3
INVENTOR.
James L. McKnight
BY
Ransler O. Wyatt Patented Jan. 10, 1950

2,493,985

UNITED STATES PATENT OFFICE 2,493,985

SPEED WARNING DEVICE

James L. McKnight, Houston, Tex.

Application February 24, 1947, Serial No. 730,408

6 Claims. (Cl. 74—526)

This invention relates to a new and useful improvement in a speed warning device.

An object of the invention is to provide a speed warning device for motor vehicles that will indicate to the operator when he has reached a given speed through resistance to the foot pedal accelerator of the motor vehicle.

Another object of the invention is to provide a speed warning device for motor vehicles of the character described that may be easily and readily connected or disconnected by the operator, while the vehicle is either at a stop or in motion.

Often while driving in regulated areas, the driver of a motor vehicle is not conscious of the exact speed of the vehicle and, as at night, the operation of a vehicle does not permit constant check of the speedometer to avoid exceeding speed limits of given areas. It is an object of this invention to provide a means for indicating to the operator of the vehicle when the maximum speed allowed has been reached and a means for easily and readily adjusting the indicator to any given speed.

The above and other objects will be apparent from the following description and illustrated in the accompanying drawings, wherein:

Figure 1 is an isometric view of the speed warning device.

Figure 2 is a side elevational cross sectional view, and

Figure 3 is a plan view, showing the speed warning device attached to a motor vehicle cowling.

Referring now more particularly to the drawings, the numeral 27 indicates a cylindrical housing which is preferably composed of two sections which are secured together by means of the conventional bolts 28, 29. A framework consisting of the longitudinally extended arms 18, 19 has suitable ports as 31, 32, 33, to receive conventional bolts (not shown) for securing the framework to the dashboard of a vehicle. The housing 27 is slidably mounted on the arm 19 by means of the set screw 17, the threaded end of which passes through a longitudinal slot 30 in the arm 19 and is received by the internally threaded port 36 in the housing 27. A suitable lock washer as 16 maintains the set screw in position.

Mounted within the housing 27 are the support bars 14, 24, preferably welded to the inside bottom section of said housing. Slidably mounted on said support bars is the adjusting table 15. A set screw 13, whose externally threaded shank engages the internal threads of the port 37 in the housing 27, has one end seated in a swivel 12 which is mounted in one end of the adjusting table 15. The opposite end of the adjusting table 15 is upwardly projected and has a port 38 through which the operating rod 23 passes. Suitable grommets, such as 25, are mounted in one end of said housing 27 and as 11 in the other end of said housing, provide bearings for the rod 23. A coil spring 10 has one end thereof mounted in a tubular housing 26 and embraces said rod 23, and the other end of said coil spring seating against the end wall of said housing 27. The grommet 11 may be shaped to form a guide for maintaining the said coil spring in position against said end wall of the housing 27 as shown in Figure 2. The tubular housing 26 is welded, or otherwise secured, to the rod 23 as indicated by the numeral 35. The rod 23 has a head 21 on the extended end thereof which has a groove 34 therein which acts as a guide for the knuckle joint 39 of the accelerator.

A tubular housing 7 having one end thereof externally threaded, is mounted on the housing 27, the threaded end thereof being received by the internally threaded port 40 in said housing 27. A cap 5 is mounted on the upper end of said tubular housing 7. A plunger rod 4 extends into the housing 27 and through said cap 5 and housing 7. Mounted on the lower end of said plunger rod 4 is a suitable stop means which abuts against the tubular housing 26 when the rod 23 is in indicating position. Mounted on the opposite end of said plunger rod 4 is a cap 3 through which the flexible shaft 1 is mounted. Said flexible shaft 1 is releasably maintained in position by means of a suitable set screw as 2.

The device is mounted on the cowling of a motor vehicle by securing the arms 18, 19 to the cowling with suitable bolts (not shown) passed through the ports 31, 32, 33. A port is drilled in the cowling through which the rod 23 extends. The set screw 17 is loosened and the housing 27 moved forward until the head 21 on the rod 23 contacts the knuckle joint of the accelerator rod 39, said accelerator rod being received and guided by the groove 34 in said head 21. The set screw 17 is then tightened to maintain the housing in position on the framework. The vehicle is then put in motion and when the desired maximum speed to be indicated has been reached the operator manipulates the adjusting screw 13, moving the adjusting table 15 backward until the head 21 contacts the knuckle joint 39 without pressure exerting against said knuckle joint. While operating the vehicle after this adjustment is made when the speed desired to be indicated is reached, the accelerator rod knuckle joint 39 will contact the head 21 and the spring 10 will exert a resistance against further acceleration of the vehicle thus indicating to the driver that he has reached the maximum speed desired. If for any reason additional speed is desired, the resistance offered to the further acceleration of the vehicle may be easily overcome and when the need for the additional speed has passed and acceleration reduced, the indicator will continue to indicate the desired speed maximum. When it is desired to discontinue the speed indication and resistance to acceleration, such as when leaving a restricted area, the operator may press the accelerator pedal 41 to the floor of the vehicle and the rod 23 will move the tubular housing 26 backward until the stop 9 on the plunger rod 4 clears the housing 26 and the spring 6 forces the rod downwardly until the stop 9 abuts against the rod 23. The operator may then release the accelerator pedal 41 and the stop 9 on the rod 4 will hold the rod 23 away from the accelerator knuckle joint 39 permitting the vehicle to be operated at any desired speed without resistance from the speed indicator. When a restricted area is again reached, or for any reason it is desired to place the speed indicator back into operation, the plunger rod 4 and stop 9 may be raised by means of the manually operated cable 1 which extends through the dash board 42, until the stop 9 clears the housing 26, permitting the spring 10 to move the housing 26 and the rod 23 back into the speed indicating position.

In some types of vehicles the accelerating means will make it desirable to exert a pull on the contact rod 23 rather than a push (as illustrated) in which event the yieldable resistance means within the housing 27 may be reversed to accommodate the pull type of accelerator. It is obvious that all motor vehicles will not have exactly the same accelerator arrangement, however, it is believed minor changes may be made in the arrangement of the working parts of the invention herein described to accommodate any of the various types of accelerating means.

The embodiments of the invention herein shown and described are to be regarded as illustrative only, and it is to be understood that the invention is susceptible to variation, modification and change within the scope of the appended claims.

What I claim is:

1. In a speed warning device for motor vehicles, means for contacting the accelerating means of the said vehicle and offering resistance thereto when a predetermined acceleration has been reached and in operative connection with said accelerating means, means for moving said contacting means out of contacting relation with said accelerating means and manually controlled spring operated means for returning said resistance means to resisting position with the accelerator at the predetermined position.

2. In a speed warning device for motor vehicles, yieldable resisting means adapted to contact the knuckle joint of the accelerator means of said motor vehicle at a predetermined degree of acceleration and to offer resistance to further acceleration thereof, means in cooperative connection with said accelerator for overcoming said resistance and moving said resisting means out of contact with said accelerator, locking means for maintaining said resisting means out of contact with said knuckle joint of said accelerator and means for manually releasing said locking means and permitting said resisting means to move back into resisting relation with said knuckle joint of said accelerator at the said predetermined degree of acceleration.

3. A speed warning device for motor vehicles comprising a framework, a main housing adjustably mounted on said framework, a contact rod extending longitudinally through and yieldably mounted in said main housing, and adapted to contact the accelerating means of the motor vehicle, means within said main housing for adjusting the point of contact of said contact rod with said accelerating means to offer yieldable resistance to said accelerating means after said accelerating means contacts said contact rod, locking means adapted to be moved by the accelerating means into engaged position to maintain said contact rod out of contacting relation with said accelerating means and means for manually moving said locking means out of engagement to permit the contact rod to return to contacting position with said accelerating means.

4. A speed warning device for motor vehicles comprising a framework, a main housing adjustably mounted on said framework, a contact rod extending longitudinally through and yieldably mounted in said main housing, and adapted to contact the accelerating means of the motor vehicle, means within said main housing for adjusting the point of contact of said contact rod with said accelerating means to offer yieldable resistance to said accelerating means after said accelerating means contacts said contact rod, an upstanding tubular housing mounted on said main housing having a plunger yieldably mounted therein and extending downwardly into said main housing, a stop on one end of said plunger adapted to move into and out of locking relation with said contact rod, means on the other end of said plunger for manually moving said plunger out of locking relation with said contact rod.

5. In a speed warning device a framework adapted to be mounted on the cowling of a motor vehicle, a main housing adjustably mounted on said framework, a contact rod extending through and yieldably mounted within said main housing, a tubular housing secured to said contact rod within said main housing in which a coil spring is mounted, adjusting means in contact with said tubular housing for adjusting the point of contact of said contact rod with the acceleration means of the motor vehicle, means mounted on said main housing adapted to be moved into contact with said contact rod to maintain said contact rod out of contact with said accelerator.

6. In a speed warning device a framework, a main housing adjustably mounted on said framework, a contact rod extending through and yieldably mounted within said main housing, a tubular housing secured to said contact rod within said main housing in which a coil spring is mounted, adjusting means in contact with said tubular housing for adjusting the point of contact of said contact rod with the acceleration means of the motor vehicle, a tubular housing mounted on said main housing having a plunger yieldably mounted therein, a stop on one end of said plunger adapted to abut against the outer surface of said tubular housing within the main housing, and adapted to move downwardly and prevent the movement of said contact rod into contacting relation with said accelerating means of said motor vehicle when the contact rod is moved backwardly through said main housing, moving the tubular housing connected thereto beyond the said stop.

JAMES L. McKNIGHT.

REFERENCES CITED

The following references are of record in the file of this patent:

UNITED STATES PATENTS

| Number | Name | Date |
| --- | --- | --- |
| 2,145,665 | Rodgers | Jan. 31, 1939 |
| 2,165,897 | Liley | July 11, 1939 |
| 2,352,136 | Ten Eyck | June 20, 1944 |
| 2,381,390 | Vanke | Aug. 7, 1945 |